Sept. 9, 1958      E. C. ADDISON      2,851,240

WEIGHING APPARATUS WITH GATE DISCHARGE

Filed Aug. 25, 1951      3 Sheets-Sheet 1

INVENTOR.
EDWARD C. ADDISON
BY
ATTORNEY.

Sept. 9, 1958 E. C. ADDISON 2,851,240
WEIGHING APPARATUS WITH GATE DISCHARGE
Filed Aug. 25, 1951 3 Sheets-Sheet 2

INVENTOR.
EDWARD C. ADDISON
BY
ATTORNEY.

Sept. 9, 1958 E. C. ADDISON 2,851,240
WEIGHING APPARATUS WITH GATE DISCHARGE
Filed Aug. 25, 1951 3 Sheets-Sheet 3

INVENTOR.
EDWARD C. ADDISON
BY
ATTORNEY.

United States Patent Office 2,851,240
Patented Sept. 9, 1958

2,851,240

WEIGHING APPARATUS WITH GATE DISCHARGE

Edward C. Addison, Westville, N. J., assignor to Beaumont Birch Company, Philadelphia, Pa., a corporation of Pennsylvania Application August 25, 1951, Serial No. 243,635

4 Claims. (Cl. 249—16)

This invention relates generally to apparatus for automatically weighing free-flowing bulk materials and is more particularly concerned with improved features of construction affording more accurate performance thereof.

It is common to provide a system for handling coal, chemicals and other free-flowing bulk materials with apparatus for automatically weighing the material as it passes therethrough. One known system comprises a receiving hopper into which the material is fed by gravity, a vibrating feeder deck which receives the material from the aforementioned hopper and feeds it to a weighing hopper which is supported on a sensitive beam-type scale, and automatic electric controls. Known constructions, however, have not been entirely satisfactory because generally the weighing hoppers are equipped with discharge gates which do not permit the material to be discharged vertically, but cause it to be discharged at an angle relative to the vertical. Consequently, the horizontal component of the force with which the material is discharged reacts against the weighing hoppers and unduly disturbs the sensitive beam-type scales, which results in inaccurate readings.

Accordingly, it is an object of this invention to provide for an automatic weighing apparatus in a system for handling free-flowing bulk materials a weighing hopper having means affording a vertical drop for the material discharged therefrom.

Another object of this invention is to provide for such an apparatus material flow control means including a weighing hopper discharge gate comprising a pair of co-acting sections affording a vertical drop for the material passing therethrough, one section acting to control movement of the other.

Still another object of this invention is to provide for such an apparatus material flow control means including a weighing hopper discharge gate affording a vertical drop for the material passing therethrough, the discharge gate being movable between closed and opened positions, and being releasable for movement from the former to the latter position by electrically controlled means responsive to the weight of the material in the hopper.

And still another object of this invention is to provide for such an apparatus material flow control means including a weighing hopper discharge gate affording a vertical drop for the material passing therethrough, movement of the discharge gate from closed to opened position acting to automatically cut off the supply of material to the weighing hopper.

Another object of this invention is to provide a weighing hopper discharge gate affording a vertical drop for the material passing therethrough, the discharge gate being self-actuating for movement from opened to closed position, such movement affording a self-cleaning action.

Another object of this invention is to provide a weighing hopper discharge gate affording a vertical drop for the material passing therethrough, said gate being provided with means for allowing movement thereof from opened to closed position only under certain operating conditions.

And accordingly, this invention may be considered as comprising the various features of construction and/or combination affording one or more of the above stated and other objects and advantages as hereinafter more particularly pointed out in the following detailed description and appended claims, reference being had to the accompanying drawing of an illustrative apparatus, in which:

Figure 1:
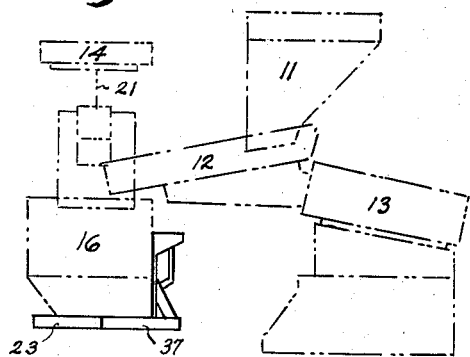
Figure 1 is a schematic view of a material handling system incorporating the present invention, everything being shown by broken lines except the discharge gate for the weighing hopper.

Referring particularly to Figure 1, the receiving hopper 11 is open at the top for receiving material fed into it by gravity, and it is open at the bottom for delivery of material to vibrating feeder deck 12, which is actuated by vibrator 13. Feeder deck 12 supplies material to an automatic weighing apparatus comprising a sensitive beam-type scale 14 supported in any known manner and a weighing hopper 16 freely suspended from scale 14.

Figure 2:
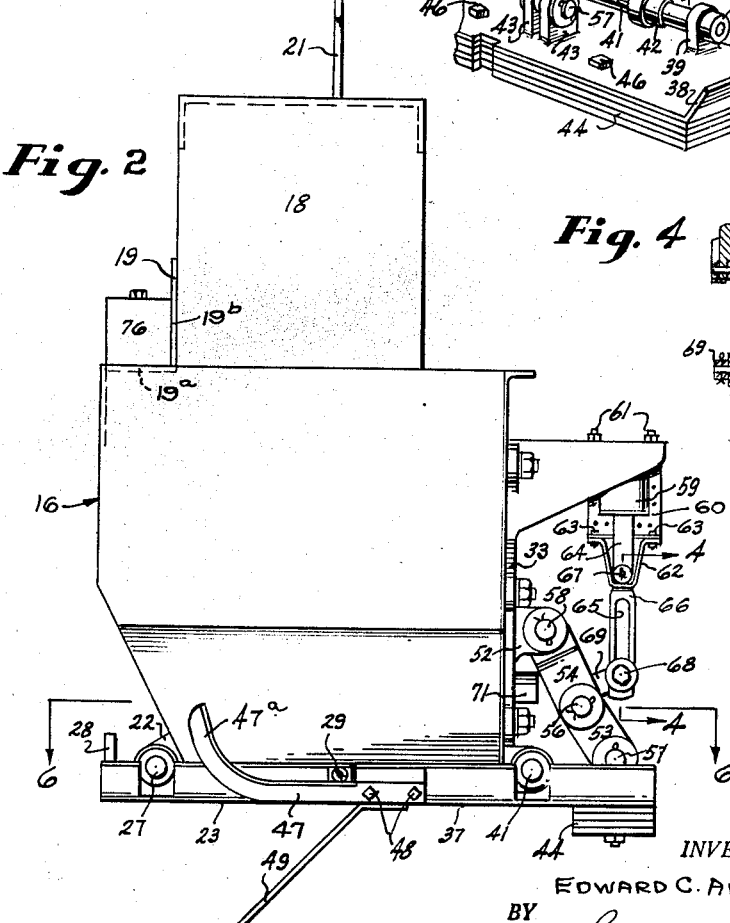
Figure 2 is a side elevation of apparatus incorporating the present invention and showing the discharge gate in closed position.
Figure 8:
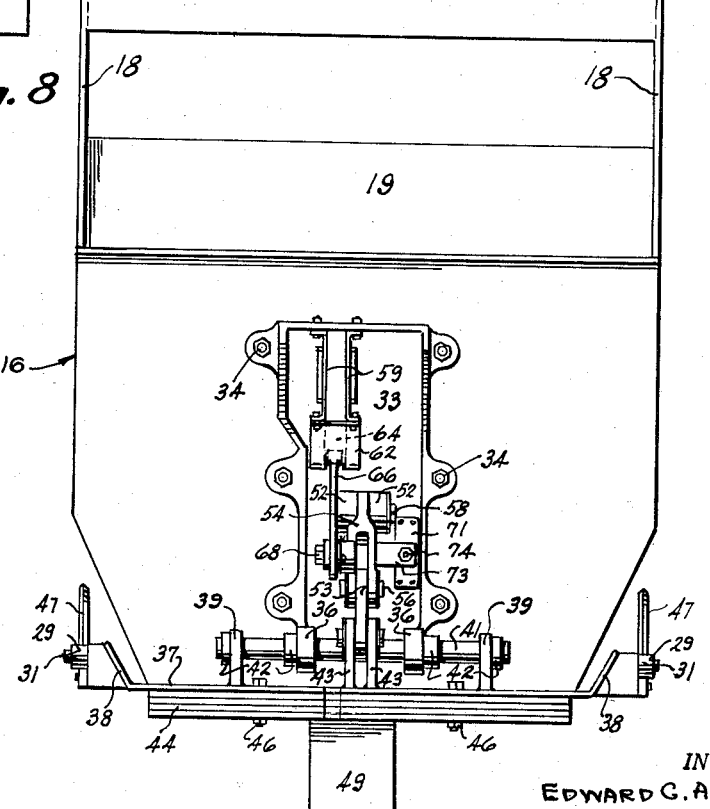
Figure 8 is a front elevation of the weighing hopper.

Weighing hopper 16 comprises a main body portion having a bottom discharge gate and fitted with mechanism for controlling action of the feeder deck and discharge gate. The hopper is further provided with a top cross member 17 to the opposite ends of which are connected a pair of vertically extending arms 18—18, as best shown in Figures 2 and 8. The hopper body is constructed of plate stock also and has four walls forming openings at the top and bottom. The front or right hand wall, as viewed in Figure 2, is preferably disposed to extend in a vertical plane while the remaining three walls of the hopper are each provided with a vertically extending upper portion and an inwardly tapering lower portion, as best shown in Figures 2 and 8. The lower ends of the supporting arms 18—18 respectively abut and are secured to the upper end portions of the side walls of the hopper body. Preferably the arms 18—18 are interconnected, as shown, by a transversely extending plate 19 of generally right-angular section, the horizontal branch 19a of which interconnects the opposite side walls of the hopper body and partially closes off the top thereof along the rear of the body. The vertical branch 19b of the plate 19 extends upwardly above the top plane of the hopper body and constitutes a back plate for deflecting the material into the hopper as the material is fed from the vibrating feeder deck 12. The supporting structure, the hopper body and the plate 19 are all welded together to form a rigid structure freely suspended from scale 14 by means of a hanger rod 21 terminally secured to the top cross member 17.

Figure 5:
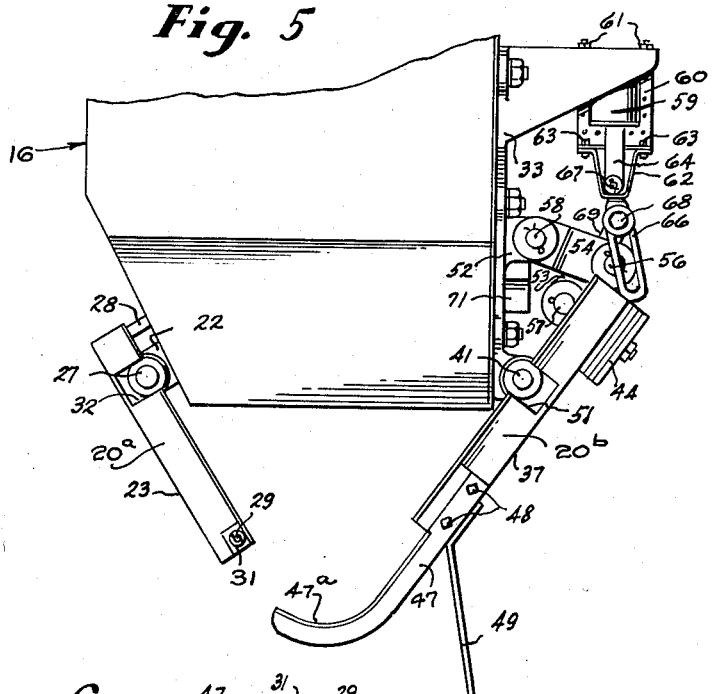
Figure 5 is a similar to Figure 2 but shows the discharge gate in opened position.
Figure 6:
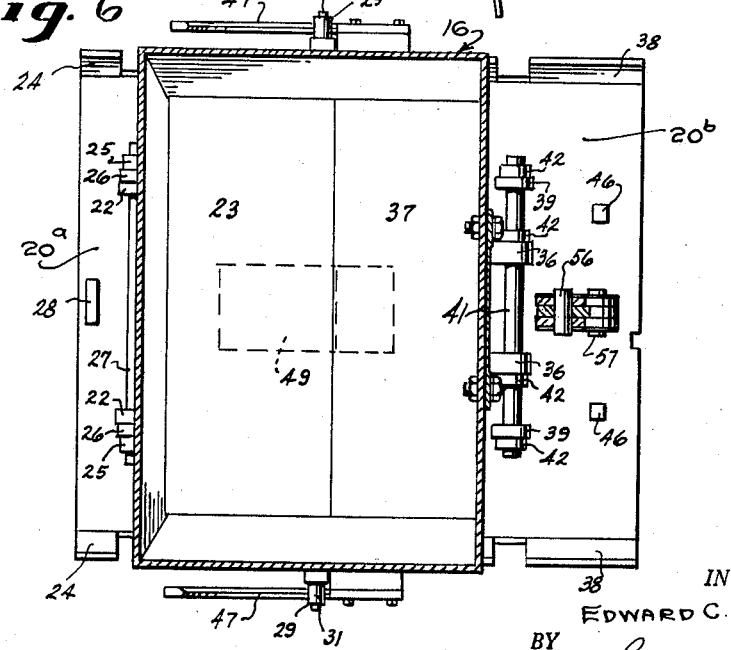
Figure 6 is a plan section on line 6—6 of Figure 2.
Figure 7:
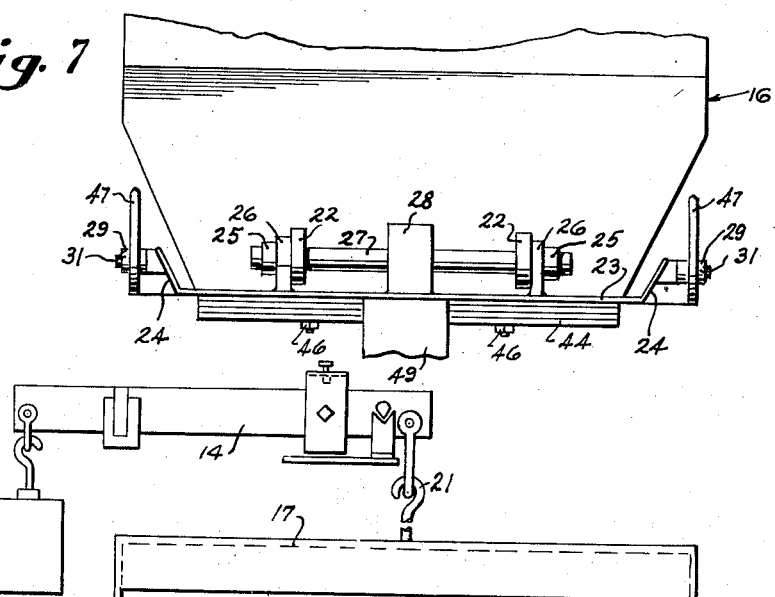
Figure 7 is a rear elevation of the weighing hopper.

The discharge gate comprises a pair of cooperating swingably mounted members 20a and 20b, the gate member 20a being adapted for pivotal connection to lugs 22—22 terminally secured as by welding or otherwise, to the rear wall of the hopper, as best shown in Figures 5 and 7. The gate member 20a essentially comprises a plate 23 having stiffening flanges 24—24 on opposite sides thereof and having also a pair of laterally spaced lugs 26—26 rigidly secured thereto, as by welding. Lugs 22—22 on the hopper body and lugs 26—26 on the gate member 20ª are provided with alined openings therein which receive a pivot pin 27, the gate member 20ª being disposed thereby, when in closed position, with lugs 26—26 straddling lugs 22—22, and with flanges 24—24 in spaced generally parallel relation to the proximate inclined lower portions of the opposite side walls of the hopper. Preferably, the pin 27 is fitted upon its opposite ends with a pair of retaining collars 25—25. A portion of plate 23 extends rearwardly of the pivot pin 27 and is provided with an upstanding lug 28 which, as best shown in Figure 5, serves as a stop for limiting downward swinging movement of the gate member 20ª relatively to the hopper body and about the axis of pin 27.

Each of the opposed flanges 24—24 of the gate 20ª is provided with an outwardly presenting stub shaft 29 for revolubly receiving thereon a roller 31, the roller shafts 29—29 being axially alined and located adjacent the freely disposed inner end of the swingable gate member 20ª. The rollers 31—31 are preferably secured against axial outward displacement from their respective supporting shafts by cotter pins suitably projected through the shafts. Opposed portions of flanges 24—24 have notches cut therein, as at 32—32, for facilitating insertion and removal of the pivot pin 27.

Figure 3:
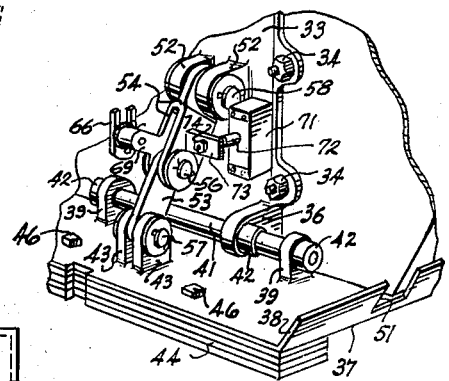
Figure 3 is a perspective view showing the toggle device for maintaining the discharge gate in closed position.
Figure 4:
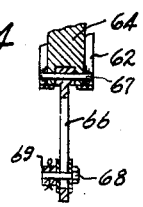
Figure 4 is a section on line 4—4 of Figure 2.

The opposite gate member 20ᵇ is pivotally mounted upon the lower end of a bracket member 33 secured, as by bolts 34—34, to the front wall of the hopper, as best shown in Figures 2 and 8, said lower end of the bracket member being provided for this purpose with a pair of lugs 36—36. The gate member 20ᵇ comprises a plate 37 having stiffening flanges 38—38 on opposite sides thereof and having also a pair of laterally spaced lugs 39—39 rigidly secured thereto, as by welding. Lugs 36—36 on the bracket 33 and lugs 39—39 on the gate member 20ᵇ have alined openings therein which receive a pivot pin 41, the gate member 20ᵇ being disposed thereby, when in closed position, with lugs 39—39 straddling the lugs 36—36, and with flanges 38—38 in spaced generally parallel relation to the proximate inclined lower portions of the opposite side walls of the hopper. As in the case of the gate member 20ª, the pivot pin 41 is fitted upon its opposite ends with a pair of retaining collars 42—42. A portion of plate 37 extends forwardly of the pivot pin 41 and is centrally provided with a pair of more or less closely spaced upstanding lugs 43—43 as best shown in Figures 3 and 8. 44—44 are counterweights secured to the bottom of the portion of plate 37 just mentioned, these weights being bolted thereto in varying amount as required by bolts 46—46.

Secured to each side flange 38 of the gate member 20ᵇ is a cam arm 47 having a freely projecting arcuately shaped portion 47ª, these arms 47—47, which are each secured in place by bolts 48, being respectively adapted to engage the rollers 31—31 on the gate member 20ª to close the latter upon closing of the gate member 20ᵇ. Also secured to the bottom of the gate member 20ᵇ, preferably centrally between its opposite side edges, is a freely projecting member 49 in the form of a flat plate inclined to extend downwardly from and beyond the free edge of the gate member 20ª, as best shown in Figures 2 and 5. Opposed portions of flanges 38—38 have notches cut therein, as at 51—51, for facilitating insertion and removal of the pivot pin 41.

The means for controlling operation of the feeder deck and discharge gate includes a toggle mechanism, control means for the toggle mechanism and control means for the feeder deck and discharge gate actuated by the toggle mechanism. The toggle mechanism essentially includes a pair of interconnected links 53 and 54, the link 53 having its lower end pivotally connected to the gate 20ᵇ between the lugs 43—43 thereof by a pivot pin 57, while its upper end is pivotally connected to the bifurcated lower end of the link 54 by a pivot pin 56. The upper end of the link 54 is in turn pivotally secured to the bracket 33 between lugs 52—52 integrally formed thereon by a pivot pin 58.

The control device for the toggle includes an electromagnetic solenoid unit 59 which is rigidly secured to the bracket 33 by means of a supporting frame 60 fixed to the bracket by bolts 61. The solenoid supporting frame is fitted at its lower end with a saddle formed of a pair of laterally spaced U-shaped straps 62—62 secured in position by bolts 63—63. The vertically movable plunger 64 of the solenoid is pivotally secured, as by a transversely disposed pivot pin 67, to a depending slotted link 66. It will be observed that the lower end portions of plunger 64 which receive the opposite ends of the pivot pin 67 respectively rest in the bights of the saddle straps 62—62 and so support the link 66 for vertical movement between said straps while at the same time permitting angular movement of the link about the axis of its pivot pin 67.

Projecting transversely through the elongated slot 65 of the link 66 is a pin 68 which is carried by a lug 69 formed as an integral lateral extension of the toggle link 54, the pin 68 being adapted to slide freely upwardly in the slot 65 of the link 66 when the toggle linkage shifts from its locked or closed position shown in Figure 2 into its opened or broken position shown in Figure 5.

The control means for the feeder deck and hopper discharge gate is governed by actuation of the toggle mechanism and includes an electric switch 71 having an actuating button 72, the switch being mounted upon the bracket 33 with its button 72 in position to be engaged by a lug 73 formed as a lateral extension of the toggle link 54 (see Figure 3). An axially adjustable screw 74 is carried by the lug 73 for direct engagement with the switch button 72, it being understood that by proper adjustment of said screw 74 the switch operation may be suitably timed in relation to the actuation of the toggle mechanism.

It will be understood further that the electric switch 71 is suitably included in electrical circuit with the operating motor for the vibrating feeder deck, and that the solenoid 59 is suitably included in electrical circuit with the weighing scale for energization of the solenoid when the beam of the weighing scale assumes a predetermined position, as when the hopper 16 is loaded with a predetermined amount of material to be discharged therefrom.

Referring particularly to Figure 1, it will be observed that operation of apparatus incorporating the present invention is as follows. Material is fed by gravity into the top of receiving hopper 11. The material in hopper 11 is gradually removed therefrom by feeder deck 12 which is actuated by vibrator 13. The material is discharged at the lower end of deck 12 into the weighing hopper 16 where it accumulates as long as the discharge gate at the bottom of the hopper is closed. The weight of hopper 16 and the discharge gate, the control mechanism mounted on the hopper and the material in the hopper is transmitted through the supporting structure and hanger rod 21 to the scale 14. It will be understood that the entire assembly just mentioned is freely suspended, and that suitable counterweights 76 are employed to counterbalance the gate-actuating mechanism and the counterweight 44 to insure normal disposition of the hopper with its central axis in substantial coincidence with the true vertical.

Figure 2 shows the discharge gate in closed position. It will be seen that the toggle links are in locked position, in which position they act as a brace between the hopper body and the gate member 20ᵇ to maintain the latter in closed position. The opposite gate member 20ª is held in place by cam arms 47—47, which respectively engage the rollers 29 on said member 20ª. At this stage of operation, the adjusting screw 74 on lug 73 is in position for depressing push button 72 of switch 71, thereby operating the motor for causing the vibrator feeder deck 12 to feed material into weighing hopper 16. The solenoid unit at the same time, is de-energized so that its plunger 64 is in its lowermost position as shown in Figure 2. Material is fed into the weighing hopper until a predetermined weight is registered by the scale, at which time the solenoid device is energized, with the result that the plunger 64 is pulled upwards to an extent sufficient to break the toggle, the links 53 and 54 being then free to assume their relative positions shown in Figure 5.

Immediately thereafter, the solenoid is de-energized and the solenoid plunger 64 returns to its original position. The weight of the material in the hopper now forces the discharge gate open, the opposite members 20ᵃ and 20ᵇ swinging downward from their positions shown in Figure 2 to their positions shown in Figure 5. Initial downward swinging movement of gate member 20ᵇ controls the downward swinging movement of gate member 20ᵃ through the coaction of cams 47 and rollers 29, the coaction being such that the discharge opening between the opposite gate sections is at all times generally vertically aligned with the discharge opening in the bottom of hopper 16, thus affording the material discharged a generally vertical drop. Further downward swinging movement of the gate member 20b, after cams 47 and rollers 29 are out of contact, does not affect operation of the member 20ᵃ, the downward movement of the latter being arrested only by the stop 28 abutting the adjacent hopper wall. It will be seen that in the open position shown in Figure 5, the member 49 depends from the gate member 20ᵇ in a generally vertical position, and that the lower end portion thereof extends well below the cam arms 47—47. Also, it will be seen that bolt 68 has moved up in slot 65, and that link 66 has swung slightly out of axial alignment with member 64. Furthermore, when the toggle link 54 swings from the position shown in Figure 2 to the position shown in Figure 5, projection 73 and adjusting screw 74 carried thereby move away from push button 72 of switch 71, thereby causing the vibrator feeder deck 12 to cease feeding material into weighing hopper 16.

As soon as the material has been discharged from hopper 16, the gate member 20ᵇ swings upward toward closed position under the influence of the counterweights 44, which are of a weight sufficient to cause the cam arms 47—47 to strike rollers 29 with sufficient force to dislodge any material adhering to either of the gate members while the latter are still downwardly inclined and in separated relation. Continued movement of the gate member 20ᵇ causes rollers 29 to ride on cam arms 47—47, forcing the rear gate member 20ᵃ to swing upward together with the front gate member 20ᵇ into their closed position shown in Figure 2. The function of the depending member 49 is to engage material piled below the hopper when it has reached a predetermined distance from the bottom of the hopper, thus preventing the discharge gate from closing, and preventing additional material from being fed into the hopper. It will be understood that as the gate members swing upward, toggle links 53 and 54 swing back to their locked position, the pin 68 moves down in the slotted link 66 toward the lower end thereof, and the lug 73 and its adjustable screw 74 move into engagement with push button 72 of switch 71, thus starting up the vibrating feeder deck again.

It should now be obvious that a system for handling free-flowing bulk materials has been provided with an automatic weighing apparatus including a hopper having a pair of coacting discharge gate sections which afford a generally vertical drop for the material discharged therefrom, thus eliminating certain undesirable forces experienced with other constructions and tending to produce inaccurate readings of the scale. In addition, it should be obvious that such an apparatus has been provided wherein the timing is automatic and wherein material is fed into the weighing hopper only when the discharge gate is closed. Furthermore, such an apparatus has been provided with a discharge gate having sections that close with a self-cleaning action, and which cannot close when the material discharged therefrom has piled up to a predetermined height below the discharge hopper.

It should be obvious that although the apparatus herein disclosed as embodying the invention has particular utility in the construction of automatic weighing equipment for handling free flowing bulk materials, certain features are of more general application and that, therefore, it is not intended to limit the invention to the exact construction and combination herein shown and described for purposes of illustration as various modifications within the scope of the appended claims may occur to persons skilled in the art.

What is claimed as new and useful is:

1. In apparatus for controlling the flow of material by gravity through the downwardly presenting discharge opening of a hopper, the combination of a gate having first and second gate sections each for closing approximately one-half of said opening and mounted for pivotal movement about horizontal axes from their fully closed positions downwardly away from one another to their fully opened positions, biasing means for yieldably maintaining said first gate section in closed position, cam means carried by said first gate section and presenting toward said second gate section, follower means carried by said second gate section, said cam means being disposed in underlying relation to and in contact with said follower means for supporting said second gate section in fully closed position and cammingly controlling the pivotal movement thereof, whereby said gate sections are swingable downwardly in unison against the influence of said biasing means, so that the discharge opening therebetween is alined with the vertical path of discharge from said hopper during said downward swinging movement, and said cam and follower means being arranged for disengagement and re-engagement at a point between the limits of swinging movement of said gate sections, means above the level of said gate sections for bracingly engaging said first gate section and maintaining the same in closed position when fully loaded with material, said first gate section and its supporting means for said second gate section being operative to maintain the latter closed, electrically controlled shiftable means operatively connected with said bracing means, and means for determining the weight of material in said hopper, said shiftable and weighing means being connected in open electric circuit, said weighing means being responsive to a predetermined weight of material in said hopper for closing said circuit, whereupon said shiftable means is energized and thereby shifted so as to effectively disable said bracing means and render the same ineffective for maintaining said gate closed.

2. In apparatus for controlling the flow of material by gravity through the downwardly presenting discharge opening of a hopper, the combination of a gate having first and second gate sections each for closing approximately one-half of said opening and mounted for pivotal movement about horizontal axes from their fully closed positions downwardly away from one another to their fully opened positions, biasing means for yieldably maintaining said first gate section in closed position, cam means carried by said first gate section and operatively disposed in underslung relation to and in contact with said second gate section for supporting said second gate section in fully closed position and cammingly controlling the pivotal movement thereof, whereby said gate sections are swingable downwardly in unison against the influence of said biasing means, so that the discharge opening therebetween is alined with the vertical path of discharge from said hopper during said downward swinging movement, and said cam and second gate section being arranged for disengagement and reengagement at a point between the limits of swinging movement of said gate sections, means above the level of said gate sections for bracingly engaging said first gate section and maintaining the same in closed position when fully loaded with material, said first gate section and its supporting means for said second gate section being operative to maintain the latter closed, electrically controlled shiftable means operatively connected with said bracing means, and means for determining the weight of material in said hopper, said shiftable and weighing means being connected in open electric circuit, said weighing means being responsive to a predetermined weight of material in said hopper for closing said circuit, whereupon said shiftable means is energized and thereby shifted so as to effectively disable said bracing means and render the same ineffective for maintaining said gate closed.

3. In apparatus for controlling the flow of material by gravity through the downwardly presenting discharge opening of a hopper, the combination of a gate having first and second gate sections each for closing approximately one-half of said opening and mounted for pivotal movement about horizontal axes from their fully closed positions downwardly away from one another to their fully opened positions, biasing means for yieldably maintaining said first gate section in closed position, cam means carried by said first gate section and operatively disposed in underslung relation to and in contact with said second gate section for supporting said second gate section in fully closed position and cammingly controlling the pivotal movement thereof, whereby said gate sections are swingable downwardly in unison against the influence of said biasing means, so that the discharge opening therebetween is alined with the vertical path of discharge from said hopper during said downward swinging movement, means above the level of said gate sections for bracingly engaging said first gate section and maintaining the same in closed position when fully loaded with material, said first gate section and its supporting means for said second gate section being operative to maintain the latter closed, electrically controlled shiftable means operatively connected with said bracing means, and means for determining the weight of material in said hopper, said shiftable and weighing means being connected in open electric circuit, said weighing means being responsive to a predetermined weight of material in said hopper for closing said circuit, whereupon said shiftable means is energized and thereby shifted so as to effectively disable said bracing means and render the same ineffective for maintaining said gate closed.

4. In apparatus for controlling the flow of material by gravity through the downwardly presenting discharge opening of a hopper, the combination of a gate having first and second gate sections each for closing approximately one-half of said opening and mounted for pivotal movement about horizontal axes from their fully closed positions downwardly away from one another to their fully opened positions, biasing means for yieldably maintaining said first gate section in closed position, cam means carried by said first gate section and operatively disposed in underslung relation to and in contact with said second gate section for supporting said second gate section in fully closed position and cammingly controlling the pivotal movement thereof, whereby said gate sections are swingable downwardly in unison against the influence of said biasing means, so that the discharge opening therebetween is alined with the vertical path of discharge from said hopper during said downward swinging movement, bracing means including a pair of articulated toggle links extending outwardly from the body of said hopper and interposed between the body of said hopper and an auxiliary portion of said first gate section extending outwardly from the pivotal connection of said first gate section with said hopper and underlying said toggle links, the latter being conjointly operative to brace said first gate section against the body of said hopper for releasably maintaining the same closed, said first gate section and its supporting means for said second gate section being operative to maintain the latter closed, an electro-magnetic solenoid unit carried by said hopper including shiftable means depending therefrom and directly connected to said toggle links through the medium of a connection for effecting lost motion between said toggle links and shiftable means after initial toggle disabling movement of said shiftable means, and means for determining the weight of material in said hopper, said solenoid unit and weighing means being responsive to a predetermined weight of material in said hopper for closing said circuit, whereupon said solenoid unit means is energized and said shiftable means shifted so as to effectively disable said bracing means and render the same ineffective for maintaining said gate closed.

References Cited in the file of this patent

UNITED STATES PATENTS

| | | |
|---|---|---|
| 570,298 | Richards | Oct. 27, 1896 |
| 657,721 | Wood | Sept. 11, 1900 |
| 1,066,656 | Richardson | July 8, 1913 |
| 1,566,148 | Lindsey | Dec. 15, 1925 |
| 1,596,122 | Seaverns | Aug. 17, 1926 |
| 1,608,962 | Seron | Nov. 30, 1926 |
| 1,850,589 | LeTourneau | Mar. 22, 1932 |
| 2,303,140 | Sackett | Nov. 24, 1942 |
| 2,451,891 | Vagim | Oct. 19, 1948 |
| 2,501,743 | Schellentroger | Mar. 28, 1950 |
| 2,636,648 | Richardson | Apr. 28, 1953 |